United States Patent

[11] 3,626,433

[72] Inventor Arthur P. Schultz
Woodstock, N.Y.

[21] Appl. No. 797,946
[22] Filed Feb. 10, 1969
[45] Patented Dec. 7, 1971

[73] Assignee Ferroxcube Corporation
Saugerties, N.Y.

[54] METHOD FOR INTERCONNECTING PLATED WIRES USED IN MAGNETIC MEMORY FRAMES
4 Claims, 4 Drawing Figs.

[52] U.S. Cl. .......... 29/604, 29/628, 340/174 PW
[51] Int. Cl. .......... H01f 7/06
[50] Field of Search .......... 29/628; 339/18 R, 103, 104, 105, 604; 340/174 PW

[56] References Cited

UNITED STATES PATENTS

| | | | |
|---|---|---|---|
| 3,203,076 | 8/1965 | Emslie et al. | 29/604 |
| 3,221,286 | 11/1965 | Fedde | 340/174 |
| 3,404,364 | 10/1968 | Paullus et al. | 339/105 |

*Primary Examiner*—John F. Campbell
*Assistant Examiner*—D. M. Heist
*Attorney*—Frank R. Trifari

ABSTRACT: A method of interconnecting the free ends of plated wire conductors used in magnetic memory frames. A soft, flexible, interconnecting ribbon conductor is shaped to a configuration which will permit its freedom of movement, and is attached to the free ends of each of two plated wire conductors positioned on opposite sides of the frame. The resultant connection will be "free floating" and stress free.

*INVENTOR.*
ARTHUR P. SCHULTZ
BY
AGENT

METHOD FOR INTERCONNECTING PLATED WIRES USED IN MAGNETIC MEMORY FRAMES

The invention relates to the field of magnetic memory storage systems, and in particular to the plated wire memory elements and the method of interconnecting these plated wire conductors. A plated wire memory system consists of a plurality of plated wire conductors threaded through a tunnel structure which spaces and positions each wire. These networks of wires are often mounted on two sides of a plane board or base and a series of conductive straps or word lines are placed across and around these plated wires. Usually each of the plated wires is fixed at each end to terminals on the plane board and consequently any movement of the plane board or terminals such as may be expected by thermal changes, or mechanical deformation will be transmitted to the plated wire conductors as an expansion, contraction, or twisting thereof and thusly induce a mechanical strain therein. Such a strain is undesirable in that it will affect the memory properties of the wires, a characteristic known as magnetostriction. In an attempt to alleviate this problem, the Matsushita U.S. Pat. No. 3,345,622 employs a flexible conductive buffer wire interposed between the plated wire conductor and its terminal connection.

Instead of providing a flexible buffer wire-type connections at the terminal ends of the plated wire, another way to prevent mechanical strain would be to use a continuous wire, that is, a wire fixed to a terminal connection at one end of the plane board and passed through the tunnel structure on one side of the plane board, then looped around the edge of the board and passed through the tunnel structure on the opposite side of the board, being finally fixed to a second terminal connection on the board. The last-mentioned system would provide some stress relief but it would be difficult to implement and impractical to use due to size and number of wires involved and the delicate handling which would be required.

The present invention relates to a method which utilizes the plated wire conductors on both sides of the plane board. The wires on each side have one end of each fixed to a terminal connection on the board, the other end being free. The free ends of the wires i.e. one from each side of the board, are attached, as by soldering, to the same single interconnecting and flexible conductor. This interconnecting conductor is shaped in a nonlinear configuration, thereby permitting the degree of freedom necessary for yielding movement in response to induced external stresses, which stresses would otherwise have been transmitted to the plated wire and consequently interfere with the memory properties of the wire. Each plated wire will thus function as a continuous conductive element and yet be "free floating," that is, stress free due to the flexibility of the interconnecting conductor which will "give" for any movement of the plane board and thus prevent any internal strain within the plated wire.

In order to facilitate the alignment of each of the interconnecting conductors with the individual free ends of the plated wires, a forming or separate strip is used which separates each of the interconnecting conductors and holds them next to the free ends of the plated wires for attachment thereto. The separate strip is of a size and shape that it will fit into a cooperating relationship with the plane board and may remain in place, if desired, after the attachment of the conductors has been made. By so leaving the separator strip in place, it will serve as a protective means to prevent damage to the interconnecting conductors or to their connections to the plated wires. Furthermore, the use of a separate strip will increase production, as this will permit a larger number of connections to be made at one time.

An object therefore of this invention is to provide a method for conductively interconnecting plated wire conductors positioned in a magnetic memory frame, such that the plated wires will be stress free.

The above and other objects and advantages will be readily apparent from the following detailed description and accompanying drawings wherein.

Figure 1:
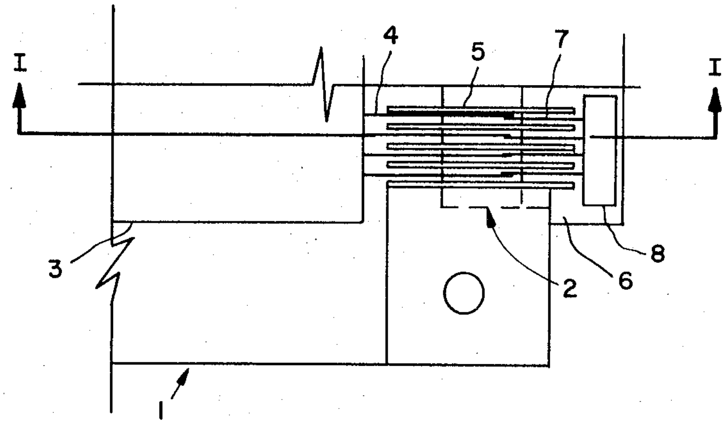
FIG. 1 is a plan view of a portion of the plane board showing an insulating separator strip positioned adjacent to the board.
Figure 2:
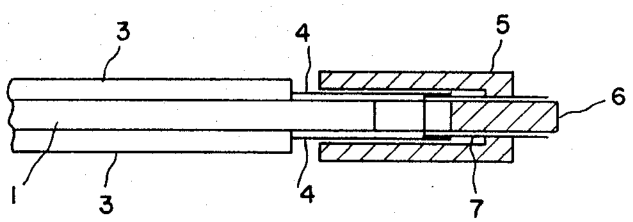
FIG. 2 is a sectional view taken along line I—I of FIG. 1.
Figure 3:
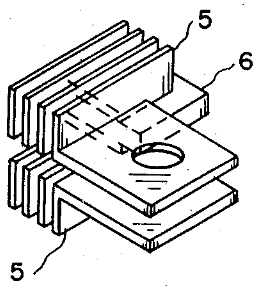
FIG. 3 is a perspective view showing a portion of the insulating separator strip.
Figure 4:
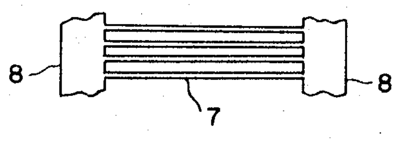
FIG. 4 is a plan view showing a portion of the strain relief blank.

Referring to FIGS. 1 and 2, there is shown a plane board or base 1 having a cutout portion at 2 and having mounted thereon a tunnel structure 3 through which plated wires 4 have been threaded. The plated wires are fixed to terminal connections at one end on the plane board (not shown) and project at their opposite and free ends into the cutout portion. The insulating separator or forming strip as shown in FIG. 3 has an upper and a lower series of spaced transverse ridges 5 separated by a longitudinal filler strip 6. The thickness of the filler strip being slightly greater than the thickness of the plane board so as to permit entry of the plane board between the upper and lower series of transverse ridges. The spacing of the ridges is such that it corresponds to the spacing of the plated wires in the tunnel structure and will permit one of such plated wires to be positioned between any two of said ridges. The interconnecting conductors may be in the form of a strain relief blank, shown in FIG. 4, which is made from a soft, flexible, conductive sheet of material having portions cut and removed therefrom so as to leave a plurality of ribbons or interconnecting conductors 7. The ends of the ribbons are joined to each other by a common portion or bar of the material 8; this will facilitate the handling of the conductors and the placement on the separator strip. The lateral spacing of the ribbon conductors corresponds to the spacing of the transverse ridges of the insulating separator strip so that a single ribbon will be contained between two of the ridges.

The process is carried out by first positioning, as by bending, a strain relief blank around the separator strip on the side opposite the filler strip such that each ribbon conductor assumes a U-shaped configuration and will lie between two of the ridges, the common portion or bar will be located beyond the ridges and adjacent the filler strip. The separator strip is then placed in the cutout portion of the plane board and will assume the position as shown in FIGS. 1 and 2. The filler strip, it should be noted, serves as a stop by abutting against the plane board adjacent to the cutout portion. In this portion, a single-plated wire on each side of the board can be positioned between two of the ridges of the respective upper and lower series on the separator strip, the said wires will also be in contact or adjacent to each of the interconnecting ribbon conductors which were previously placed between the ridges. The free ends of the wires are now joined, in any of the conventional ways such as by soldering, to the interconnecting ribbon conductors and the common portion or bar of the strain relief blank is severed. The insulating separator strip may be left in position or removed. Each of the plated wires on both sides of the board are now interconnected by means of the ribbon conductors and also free to float or move by virtue of the fact that the interconnecting ribbon conductors are made of a soft and flexible, material and are shaped in a nonlinear configuration which will permit their freedom of movement in any direction. It will be evident that any stresses caused by the movement of the plane board will not be transmitted to the plated wires, since the interconnecting ribbon conductors are yieldable and this movement will thus relieve any strain which would have been induced in the plated wires if the terminal connections were immovably fixed to the plane board.

It should be noted that the interconnecting conductors do not necessarily have to be in the form shown in the strain relief blank, nor is the separator strip the only means for positioning the conductors; in fact, separate and independent conductors of a flexible material shaped into a configuration which will permit freedom of movement, can be individually attached to the free ends of the plated wires. Furthermore, it should be obvious to those skilled in the art that bending and/or holding devices other than the separator strip shown could be equally well adapted for this purpose.

The invention has been described showing a possible method of implementation, however it should be understood that other obvious modifications could be made within the scope and spirit of the invention.

I claim:

1. A method for interconnecting the free ends of plated wire conductors positioned on opposite sides of a magnetic memory frame comprising the steps of: positioning a plurality of flexible joined interconnecting conductors in a nonlinear configuration through ridges of a forming strip, each of said interconnecting conductors passing between a pair of ridges on said strip, arranging said forming strip carrying said interconnecting conductors on the memory frame so that the free ends of the plated wire conductors on opposite sides of the memory frame will be aligned between a pair of ridges on the forming strip so that a plated wire from either side of said frame is adjacent the same interconnecting conductor, connecting the free end of each of said plated wires to said interconnecting conductor, and severing said joined interconnecting conductors from one another.

2. The method for interconnecting plated wire conductors according to claim 1, further comprising the additional step of inserting a filler strip into said forming strip and wrapping said joined interconnecting conductors around said filler strip to thereby form said nonlinear configuration.

3. The method for interconnecting plated wire conductors according to claim 2, wherein said nonlinear configuration is substantially a U-shape.

4. The method for interconnecting plated wire conductors according to claim 3, wherein the plated wires are joined to the interconnecting conductors at the closed end of the U-shaped configuration.

* * * * *